Dec. 26, 1967     J. M. HANSEN     3,359,810
MECHANISM TO CONVERT ROTATING ACTION TO
RECIPROCATING ACTION AT REDUCED SPEED
Filed March 2, 1966

INVENTOR.
JOHN M. HANSEN
BY
Bertha L. MacGregor
ATTORNEY

United States Patent Office 3,359,810
Patented Dec. 26, 1967

3,359,810
MECHANISM TO CONVERT ROTATING ACTION TO RECIPROCATING ACTION AT REDUCED SPEED
John M. Hansen, Racine, Wis., assignor to Scovill Manufacturing Company, Waterbury, Conn., a corporation of Connecticut
Filed Mar. 2, 1966, Ser. No. 531,305
9 Claims. (Cl. 74—60)

This invention relates to mechanism to convert rotating action to reciprocating action at reduced speed. The mechanism is useful for embodiment in power operated knives for imparting reciprocatory movement to knife blades and for embodiment in other power operated tools and appliances.

The main object of the invention is to provide very simple and efficient mechanism to convert rotary to linear reciprocatory motion which includes a ball, a rotated driving and ball retaining plate, and a non-rotary tiltable disc having a novel specially contoured ball contacting surface which faces the driving plate.

Another object of the invention is to provide novel flexible means for connecting the tiltable disc to a support and for connecting the disc to one or more arms which transmit reciprocatory motion to other mechanism such as the blades of a power operated knife, or to other motor driven tools.

The objects and advantages of the invention will be apparent from the drawings and following description.

Figure 1:
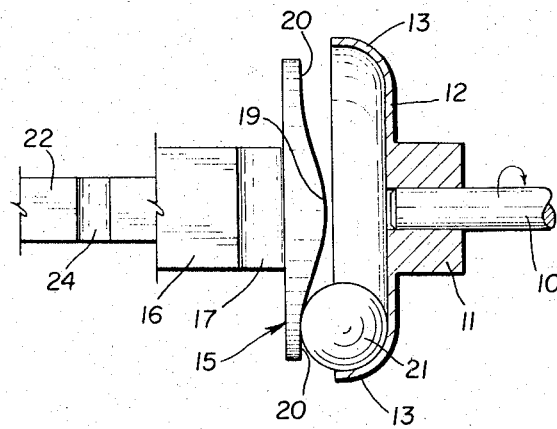
FIG. 1 is an elevational view, partly in section, of mechanism embodying my invention.
Figure 2:
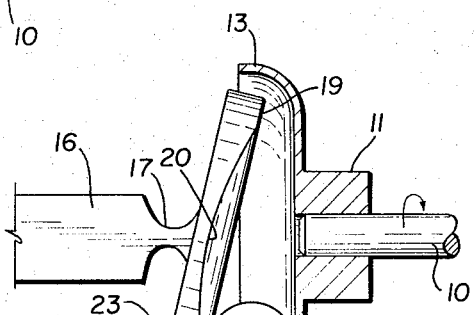
FIGS. 2 and 3 are views similar to FIG. 1, but in planes at right angles thereto, showing two different positions of the tiltable disc and parts connected thereto.
Figure 3:
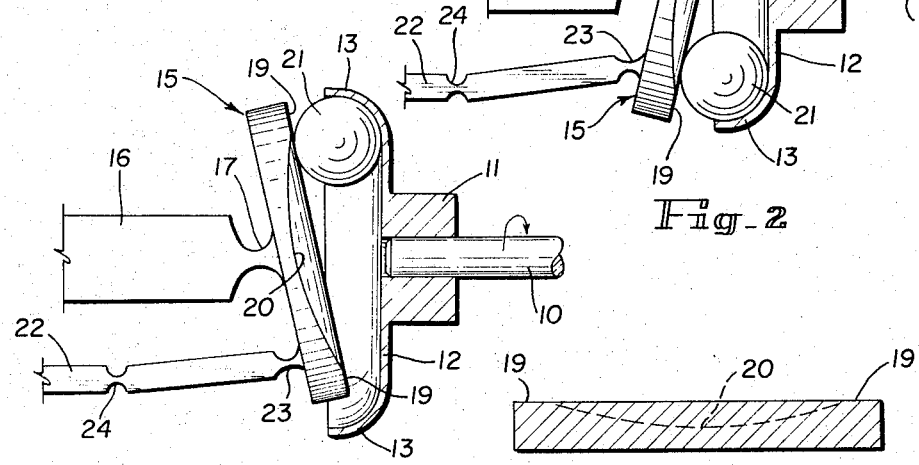
Figure 5:
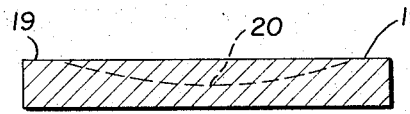
FIG. 5 is a sectional view in the plane of the line 5—5 of FIG. 4.
Figure 4:
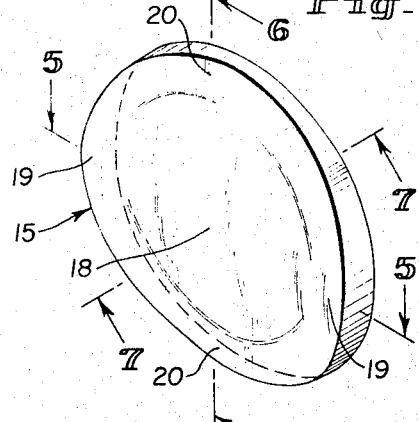
FIG. 4 is an isometric view of the tiltable disc, showing its specially contoured face.
Figure 6:
FIG. 6 is a sectional view in the plane of the line 6—6 of FIG. 4.
Figure 7:
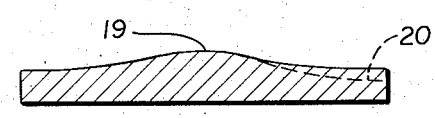
FIG. 7 is a sectional view in the plane of the line 7—7 of FIG. 4.

In the embodiment of the invention shown in the drawings, a rotated shaft 10 has fixed thereon a hub 11 integral with or connected to a driving plate 12 which has a ball retaining transversely curved peripheral rim portion 13. A non-rotating disc 15 is connected to a fixed support 16 by a flexible web 17. As shown, the disc, support and web are integrally formed of plastic material, but they may be made separately of different material, provided the web 17 permits tilting motion of the disc 15 relatively to the fixed support.

The disc 15 has a symmetrical working surface in which the center 18 and diametrically opposite peripheral areas 19, 19, as well as the area between the areas 19, 19 and the center 18, lie in one plane. Diametrically opposite peripheral areas 20, 20, each spaced ninety degrees from an area 19, 19, are in a different plane. For convenience, the areas 19 will be termed the "high" areas and the areas 20 will be termed the "low" areas. The working surface of the disc 15 slopes gradually from the high area adjacent and between the points 19, 19, toward the lower peripheral areas adjacent the low points 20, 20.

The disc 15 is spaced from the driving plate 12 a distance sufficient to receive a ball 21 between the plate 12 and the low areas 20, 20 of the disc. The rim portion 13 is sufficiently deep to retain the ball between the plate and disc.

A member 22 is connected by a flexible web 23 to the disc 15 adjacent the peripheral edge of the disc on the side opposite the working face of the disc. Another flexible web 24 may be formed in the member 22 to facilitate its reciprocatory movement and connection to reciprocated blades or other tool devices. As shown in the drawings, the member 22 is a reciprocated arm, and the disc, webs and arm are integrally molded of plastic material, but the said parts may be made separately and the connecting means between the disc and arm may be other linkage which permits pivotal movement between the member 22 and the disc 15. The webs 17, 23, are relatively thin in the dimension of the parts to be flexed to permit rocking motion of the disc 15.

The rolling path of the ball is controlled by the contour of the working face of the disc 15 and by the relative position of the rim 13 of the driving plate 12. The ball travels alternately over the high and low peripheral areas of the disc and causes the disc to rock back and forth to transmit reciprocatory motion to the member 22. Since the length of the rolling path is greater than the circumference of the ball, the hub and plate 12 must rotate more than once to return the ball to its starting position. Thus the reciprocatory speed of the knife blades or other tools is reduced as compared to the rotary speed of the shaft.

In describing the invention, reference has been made to a particular example embodying the same, but I wish it to be understood that the invention is not limited to the construction shown and that various changes may be made in the construction and general arrangement of parts without departing from the invention as defined by the appended claims.

I claim:
1. Mechanism to convert rotating action to reciprocating action at reduced speed comprising
   (a) a rotated shaft,
   (b) a driving plate provided with a ball retaining peripheral rim fixed on the shaft and rotated with the shaft,
   (c) a support,
   (d) a non-rotated disc having a working surface facing the driving plate,
      (d-1) said working surface having diametrically opposite high areas, diametrically opposite low peripheral areas located between said high peripheral areas, and gradually inclined surfaces between the high and low areas, providing an alternately high and low path adjacent the periphery of the disc,
   (e) a connecting means between the center of the disc and the support permitting tilting movement of the disc,
   (f) a ball freely rollable between the driving plate and disc on said alternately high and low path of the disc, and
   (g) a member connected to the disc at a distance from the disc center for receiving reciprocatory motion from the disc when the disc is tilted by the ball traveling on said path.

2. The mechanism defined by claim 1, in which the connecting means between the disc and the support is a web made of plastic material.

3. The mechanism defined by claim 1, in which the member connected to the disc at a distance from the disc center is an arm and a flexible joint connected to the disc adjacent the peripheral edge of the disc opposite its working face.

4. The mechanism defined by claim 1, in which the disc, support and connecting means between them are molded integrally of plastic material.

5. The mechanism defined by claim 1, in which the disc and the reciprocated member are integrally connected by a flexible joint made of plastic material.

6. The mechanism defined by claim 1, in which the length of the rolling path of the ball on the disc is greater than the circumference of the ball.

7. The mechanism defined by claim 1, in which the ball retaining peripheral rim is curved transversely and forms with the driving plate a dished shaped driving member which cooperates with the contoured working face of the disc to control the path in which the ball travels on said disc.

8. The mechanism defined by claim 1, in which the disc tilts about a fulcrum extending across the center and diametrically opposite low peripheral areas when the ball passes over a high peripheral area, whereby a powered stroke of the reciprocated member occurs in one direction when the ball passes over one high peripheral area and in the opposite direction when the ball passes over the other high peripheral area.

9. The mechanism defined by claim 1, in which the connecting means between the center of the disc and the support permitting tilting movement of the disc is a flexible joint which serves as a damper to overcome inertia of the disc and to prevent excessive overtravel in the reciprocatory movement of the disc.

References Cited

UNITED STATES PATENTS

| | | | |
|---|---|---|---|
| 244,799 | 7/1881 | Dye | 74—60 |
| 2,436,908 | 3/1948 | Van Weenen et al. | 74—60 |
| 2,920,488 | 1/1960 | Savage | 74—60 |
| 3,060,712 | 10/1962 | Sisson | 74—60 |
| 3,221,564 | 12/1965 | Raymond | 74—60 |

FRED C. MATTERN, Jr., *Primary Examiner*

W. S. RATLIFF, *Assistant Examiner.*